United States Patent

[11] 3,549,801

[72] Inventor Artice M. Davis
Laurence Harbor, N.J.
[21] Appl. No. 727,240
[22] Filed May 7, 1968
[45] Patented Dec. 22, 1970
[73] Assignee Bell Telephone Laboratories Incorporated
Murray Hill, N.J.
a corporation of New York

[54] KEYED VIDEO CLAMPING CIRCUIT WITH A PULSE WIDTH DISCRIMINATOR TO MINIMIZE NOISE INTERFERENCE
4 Claims, 3 Drawing Figs.

[52] U.S. Cl. .......... 178/7.3
[51] Int. Cl. .......... H04n 3/16
[50] Field of Search .......... 178/6NS, 7.1DC, 7.3DC, 7.5DC, 69.5CB

[56] References Cited

UNITED STATES PATENTS

| | | | |
|---|---|---|---|
| 2,824,244 | 2/1958 | Fulmer .......... | 178/6NS |
| 2,930,846 | 2/1969 | Jose .......... | 178/7.1DC |
| 3,120,861 | 2/1964 | Finlay et al. .......... | 250/219Df |
| 3,461,230 | 8/1969 | Hodge et al. .......... | 178/6.6 |

*Primary Examiner*—Robert L. Griffin
*Assistant Examiner*—Donald E. Stout
*Attorneys*—R. J. Guenther and E. W. Adams, Jr.

ABSTRACT: A keyed video clamping circuit is disclosed having pulse width discrimination circuitry to distinguish between a noise pulse and a synchronizing pulse so that the clamping operation will not be triggered at an improper interval. All pulses first activate a time control circuit, such as a linear ramp or an exponential RC circuit. When a pulse lasts longer than a predetermined decision period the voltage at the output of the time control circuit rises above a predetermined threshold level to trigger the clamping operation. Since most noise pulses have a short duration they will be eliminated during the decision period.

INVENTOR
A. M. DAVIS
BY Leonard D. Arnold
ATTORNEY

KEYED VIDEO CLAMPING CIRCUIT WITH A PULSE WIDTH DISCRIMINATOR TO MINIMIZE NOISE INTERFERENCE

BACKGROUND OF THE INVENTION

This invention relates generally to clamping circuits and, more particularly, to keyed video clamping circuits with apparatus to minimize noise interference.

In a video system the video signal contains time varying video information, synchronizing pulses, and a direct-current control level. The direct-current control level must be maintained in order to interpret the information signal properly.

One method of maintaining the direct-current control level is to use direct-current coupling. This method, however, is both impractical and uneconomical in video systems. The most common method, which is to be considered here, is alternating-current coupling followed by direct-current restoration.

It has been found in the art that one of the most effective techniques for restoring the direct-current level to a video signal is to clamp the tips of the synchronizing pulses to a direct-current reference potential during the synchronizing pulse interval. The clamping operation is performed by keying a gating circuit with the synchronizing pulses. The gating circuit is enabled for a predetermined time within the remainder of the synchronizing pulse interval, so that the direct-current level is accurately restored to the video signal. With prior art keyed clamping circuits, however, noise impulses tended to trigger the clamping circuit at an improper interval, i.e., when the synchronizing pulses were not present. This caused the signal to be clamped at the wrong level and resulted in severe signal distortion in the video receiver.

Various methods have been devised to insure proper operation of keyed clamping circuits in the presence of impulse noise. One method, disclosed in the copending application of E. D. Stoll, Ser. No. 681,289, filed Nov. 7, 1967, uses a gating technique to inhibit the clamping operation outside of predetermined gating periods which are synchronized with the frequency of the horizontal synchronizing pulses in the video signal. This method provides good noise immunity but its operation depends on a particular synchronizing pulse format because the clamping operation can be triggered only during the gating periods.

It is accordingly the object of the present invention to provide a simple and flexible clamping circuit which clamps the video signal to a predetermined reference potential in the presence of impulse noise without the necessity of operating in any given synchronizing pulse format.

SUMMARY OF THE INVENTION

In the standard television signal used in the United States and described in detail in FIG. 25–3 on page 980 of Terman "Electronic and Radio Engineering," published by McGraw-Hill Book Company (4th Edition 1955), there are three types of synchronizing pulses which occur during predetermined blanking intervals. Horizontal synchronizing pulses occur during the horizontal blanking intervals to synchronize the horizontal retrace on the picture tube. Equalizing pulses, vertical synchronizing pulses, and horizontal synchronizing pulses occur during the vertical blanking interval to synchronize the vertical retrace on the picture tube and begin the horizontal sweep at the top of the picture tube. Each of these synchronizing pulses has a predetermined pulse width, the narrowest of these being the equalizing pulses.

In accordance with the present invention, the synchronizing pulses are distinguished from noise pulses on a pulse width basis. Essentially, the synchronizing pulse interval is divided into two time periods. The first is a decision period and the second is a clamping period. The pulse width discrimination scheme is based on the fact that since most noise pulses are much narrower than the narrowest synchronizing pulse, the noise pulses may be eliminated in the decision period.

A triggering pulse, be it a noise pulse or a synchronizing pulse, first activates a time control circuit such as a ramp circuit which has a linear voltage rise or an RC circuit which has an exponential voltage rise. The linear ramp circuit remains activated only for the duration of the triggering pulse. At the end of the triggering pulse the ramp circuit is automatically reset to an inactive or zero output state until the occurrence of the next triggering pulse. By virtue of this resetting operation, the linear ramp circuit is able to respond individually to each triggering pulse in spite of a condition in which a high frequency or a high repetition rate of triggering pulses and noise impulses significantly reduces the interval between each pulse or impulse to be evaluated. If the pulse lasts longer than the decision period the level of the voltage at the output of the time control circuit rises above a predetermined threshold level and triggers the clamping operation. The clamping circuitry is timed to complete the clamping operation within the period before the end of the narrowest synchronizing pulse, namely, the equalizing pulse, so that the signal will be clamped to the proper level. Thus, the clamping circuit will be triggered improperly only in the unusual case when a noise pulse is wide enough to last longer than the decision period. For the most part noise pulses will not trigger the clamping operation because they will not last long enough to cause the voltage in the time control circuit to build up to the threshold level.

DETAILED DESCRIPTION

Figure 1:
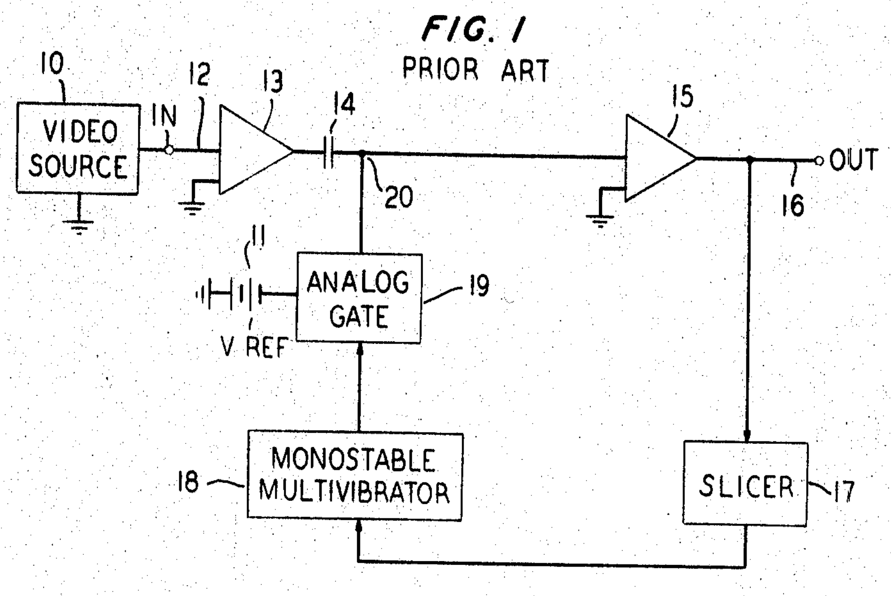
FIG. 1 PRIOR ART
FIG. 1 is a block diagram of the simple keyed clamping circuit well known in the prior art.

The function of the keyed clamping circuit shown in FIG. 1 and found in the prior art is to clamp the bottoms of the synchronizing pulses from the video source 10 to reference potential 11. The video signal from source 10 is applied at input 12 and appears at capacitor 14 through high impedance unity gain amplifier 13. When the clamping circuit is operating, the signal at output 16 is the video signal clamped to the proper direct-current reference level 11. High impedance amplifier 13 isolates clamping capacitor 14 from the incoming line represented by source 10. Amplifier 15, between clamping capacitor 14 and output 16, is a high impedance unity gain amplifier which prevents the rapid discharge of clamping capacitor 14 to maintain the proper direct-current level.

Figure 2:
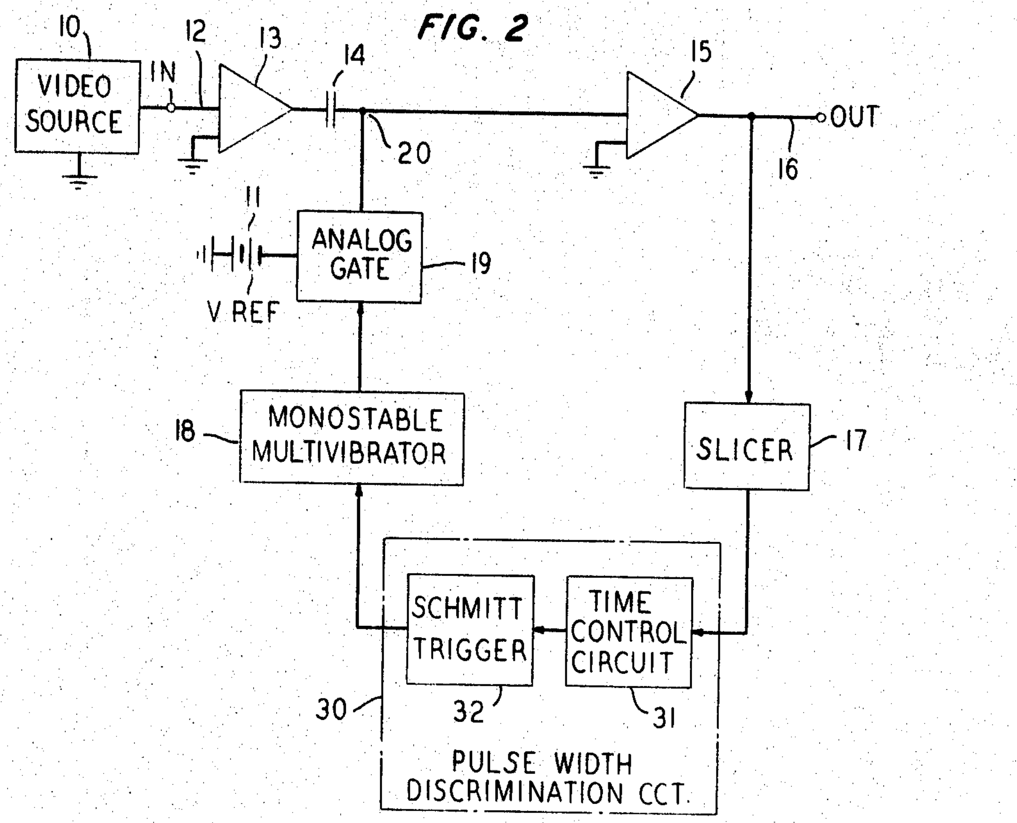
FIG. 2 is a block diagram of an embodiment of the present invention.

In both FIG. 1 showing the prior art and FIG. 2 showing an embodiment of the present invention the video information signal from source 10 is positive-going and the synchronizing pulses are negative-going. It should be understood that in accordance with the principles of the invention, the circuit elements may be arranged to operate equally well in the situation where the information signal is negative-going and the synchronizing pulses are positive-going.

To perform the clamping operation in the apparatus shown in FIG. 1 the signal from source 10 at the output of high impedance amplifier 15 is fed through slicer circuit 17 to the monostable multivibrator 18. In the presence of the negative-going synchronizing pulses slicer circuit 17 generates a pulse output which triggers monostable multivibrator 18.

Monostable multivibrator 18, well known in the art, changes state in response to the trigger pulses at the output of slicer circuit 17 and enables analogue gate 19. During the period that analogue gate 19 is enabled reference voltage source 11 is connected to output terminal 20 of capacitor 14. Monostable multivibrator circuit 18 is timed to revert back to its original state before the end of the synchronizing pulse. In this manner, analogue gate 19 is enabled only during the interval that the synchronizing pulse occurs so that the proper direct-current control level is accurately restored to the video signal.

A block diagram of a clamping circuit embodying the present invention is shown in FIG. 2. The apparatus in FIG. 2 corresponds to the identically numbered apparatus in FIG. 1, except for the addition of pulse width discrimination circuit 30, which contains time control circuit 31 and Schmitt trigger 32. Essentially, pulse width discrimination circuit 30 determines if the pulse appearing at the output of slicer 17 results from a noise pulse or a synchronizing pulse, so that monostable multivibrator circuit 18 will not be triggered at an improper interval.

Initially, slicer circuit 17 is triggered by any negative-going pulse whether it be a noise pulse or a synchronizing pulse. In turn, time control circuit 31 in pulse width discrimination circuit 30 is triggered by the pulse at the output of slicer 17 irrespective of whether the output was caused by a noise pulse or a synchronizing pulse. In the presence of a pulse at the output of the slicer 17 the output voltage of time control circuit 31 continually rises in value. When the output of the time control circuit 31 rises above a predetermined threshold level, Schmitt trigger 32 is activated. Schmitt trigger 32 then activates monostable multivibrator 18, which enables analogue gate 19. Schmitt trigger 32, however, will not be activated unless the pulse at the output of slicer circuit 17 has a sufficient duration or width to cause the voltage from time control circuit 31 to build up to the threshold level.

The time that it takes for the output voltage of time control circuit 31 to build up to the threshold level is called "decision period." This period is of a predetermined duration, but it may be adjusted by varying the circuit components of the time control circuit 31 or by varying the threshold level of Schmitt trigger 32. One possibility is to use a ramp generator circuit in the time control circuit 31 so that the voltage will build up in a linear manner. Thus, the time that it takes to go between a first level to the threshold level can be determined on the basis of a linear function. Another possibility is to use an RC circuit in time control circuit 31. With this circuit the voltage builds up in an exponential manner so that the time it takes to go from a base level to the threshold level is determined by an exponential function. The only criteria is that output voltage of time control circuit 31 be adapted to rise in value from its base voltage to the threshold voltage in a predetermined interval from the time it is triggered by slicer circuit 17. Schmitt trigger circuit 32, well known in the prior art, may be easily adjusted to trigger at a variety of predetermined threshold levels so that the decision period may be varied to accommodate different triggering pulses from source 10.

Figure 3:
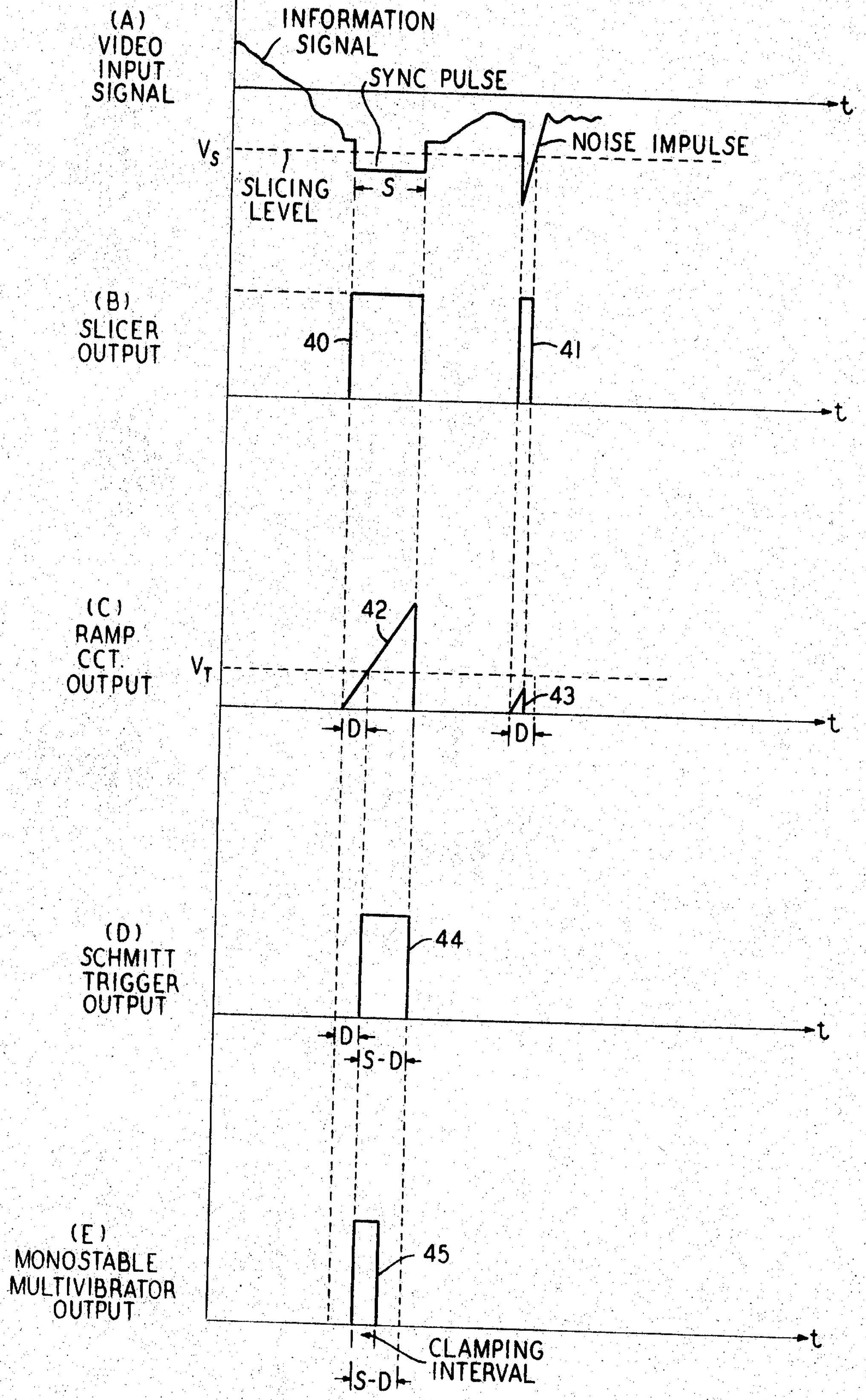
FIG. 3 is a series of waveforms illustrating the operation of the circuit shown in FIG. 2.

FIG. 3 shows a series of waveforms illustrating the operation of the clamping circuit shown in FIG. 2. For simplicity the waveforms in FIG. 3 are drawn as if a linear ramp circuit were used in the time control circuit 31.

FIG. 3A shows a section of the video signal consisting of a time varying information portion, a synchronizing pulse and a noise impulse. The synchronizing pulse, for purposes of illustration, may be considered to be an equalizing pulse, but it must be kept in mind that it may be any one of the synchronizing pulses.

The output of the slicer circuit 17 is shown in FIG. 3B. When either the synchronizing pulse or the noise pulse, shown in FIG. 3A, goes below the slicing level $V_s$ a pulse appears at the output of slicer circuit 17. The output pulse, shown in FIG. 3B, lasts for the same interval that the synchronizing pulse or the noise pulse remains below the slicing level. The output of slicer circuit 17 in response to the synchronizing pulse is shown by output pulse 40, and the output of slicer circuit 17 in response to the noise pulse is shown by output pulse 41.

FIG. 3C shows the outputs of the ramp circuit in time control circuit 31 which are formed in response to pulses 40 and 41 from the slicer circuit 17. The output of the ramp circuit continually builds up in a linear manner while a pulse from slicer circuit 17 is present. The output of the ramp circuit also instantaneously resets to an inactive state as soon as the output of the slicer circuit 17 ceases. As can be seen from the output waveform 42, the synchronizing pulse causes the ramp circuit to build up above the threshold level $V_t$, which is shown by the dotted line across the graph. As shown by output waveform 43, however, the noise pulse does not have sufficient duration to cause the output of the ramp circuit to build up to the threshold level $V_t$. Consequently, as shown by output pulse 44 in FIG. 3D, Schmitt trigger 32 is activated only in response to the synchronizing pulse.

Monostable multivibrator 18, whose output is shown by pulse 45 in FIG. 3E, is triggered when Schmitt trigger 32 is activated. As can be seen from output pulse 45, the monostable multivibrator is timed to return to its normal stable state as some time before the end of the synchronizing pulse.

The interval during which the monostable multivibrator is activated, as indicated by the presence of output pulse 45, is called the "clamping interval," which is the interval that the analogue gate is enabled. If the synchronizing pulse is assumed to have a pulse duration S, as shown in FIG. 3A, and the decision period is assumed to be an interval D, as shown in FIG. 3C, then the clamping interval shown in FIG. 3E must be confined within the interval S-D.

It should be understood that the above-described embodiment is merely illustrative of applications of the principles of the invention. Various modifications in clamping circuits in accordance with the invention may be effected by persons skilled in the art without departing from the spirit and scope of the invention.

I claim:

1. A keyed video clamping circuit to which is applied a train of pulses including pulses having an amplitude exceeding a predetermined level and a width greater than a predetermined decision width comprising:
   - a clamping capacitor having an input and an output terminal, said input terminal being adapted to receive said train of pulses;
   - a reference voltage source;
   - gating means for connecting the output of said clamping capacitor to said reference voltage source upon actuation of said gating means;
   - means responsive to pulses in said pulse train exceeding said predetermined level for generating first triggering pulses having a fixed amplitude and width corresponding to the width of the pulses above said predetermined level;
   - means responsive to the beginning of each of said first triggering pulses for generating a time varying signal of increasing amplitude and responsive to the end of each of said first triggering pulses for resetting to zero output, said time varying signal rising above a predetermined threshold level when said first triggering pulse exceeds a predetermined decision width;
   - means responsive to said time varying signals in excess of said predetermined threshold level for generating second triggering pulses each having a width corresponding to the duration of each of said time varying signals above said predetermined threshold;
   - and means responsive to said second triggering pulses for activating said gating means for a fixed interval within the duration of each of the pulses in said pulse train.

2. A keyed video clamping circuit as claimed in claim 1 wherein said means responsive to pulses in said pulse train comprises a slicer circuit and said means responsive to the beginning of each of said first triggering pulses comprises an independent ramp generating circuit having an active state that rises linearly at a fixed rate to produce a linear ramp and an inactive state for resetting to zero output until the next occurrence of a first triggering pulse.

3. A keyed video clamping circuit as claimed in claim 1 wherein said means responsive to said time varying signals in excess of said predetermined threshold level comprises a Schmitt triggering circuit.

4. A keyed video clamping circuit as claimed in claim 1 wherein said means responsive to said second triggering pulse is a monostable multivibrator circuit having an output pulse of a fixed interval ending within the duration of the pulses of said pulse train.